(12) United States Patent
Nagamatsu et al.

(10) Patent No.: US 7,276,150 B2
(45) Date of Patent: Oct. 2, 2007

(54) METHOD OF DESULFURIZING GAS OIL FRACTION, DESULFURIZED GAS OIL, AND DESULFURIZER FOR GAS OIL FRACTION

(75) Inventors: Shigeki Nagamatsu, Yokohama (JP); Jun Abe, Oarai-machi (JP); Akira Sugimoto, Yokohama (JP); Makoto Inomata, Oarai-machi (JP); Tetsuya Watanabe, Yokohama (JP)

(73) Assignee: JGC Corporation, Tokyo (JP)

( * ) Notice: Subject to any disclaimer, the term of this patent is extended or adjusted under 35 U.S.C. 154(b) by 547 days.

(21) Appl. No.: 10/275,038

(22) PCT Filed: Nov. 16, 2001

(86) PCT No.: PCT/JP01/10042

§ 371 (c)(1),
(2), (4) Date: Oct. 31, 2002

(87) PCT Pub. No.: WO02/40617

PCT Pub. Date: May 23, 2002

(65) Prior Publication Data

US 2003/0146133 A1    Aug. 7, 2003

(30) Foreign Application Priority Data

Nov. 17, 2000  (JP) .............................. 2000-351082

(51) Int. Cl.
*C10L 1/00* (2006.01)
*C10G 45/00* (2006.01)

(52) U.S. Cl. .................... 208/209; 208/14; 208/15; 208/59; 208/89; 208/94; 208/143; 208/144; 208/210; 208/212; 208/218

(58) Field of Classification Search .................. 208/59, 208/89, 94, 143, 144, 210, 218, 14, 15, 209, 208/212
See application file for complete search history.

(56) References Cited

U.S. PATENT DOCUMENTS

| 4,006,076 A | 2/1977 | Christensen et al. |
| 4,990,242 A | 2/1991 | Louie et al. |
| 5,522,983 A * | 6/1996 | Cash et al. .................. 208/59 |
| 5,741,414 A | 4/1998 | Waku et al. |
| 6,156,190 A | 12/2000 | Xia et al. |

FOREIGN PATENT DOCUMENTS

| EP | 0 553 920 A1 | 8/1993 |
| EP | 0 940 464 A2 | 9/1999 |
| JP | 04-046993 B2 | 2/1992 |
| WO | WO99/40165 A1 | 8/1999 |

* cited by examiner

*Primary Examiner*—Glenn Caldarola
*Assistant Examiner*—Prem C. Singh
(74) *Attorney, Agent, or Firm*—The Webb Law Firm

(57) ABSTRACT

The process for desulfurizing a gas oil fraction according to the invention comprises a low-boiling gas oil fraction hydrodesulfurization step (I) wherein a low-boiling gas oil fraction is desulsurized under the condition of a $H_2$/Oil ratio of 70 to 200 $Nm^3$/kl to obtain a treated oil, a high-boiling gas oil fraction hydrodesulfurization step (II) wherein a high-boiling gas oil fraction is desulsurized under the condition of a $H_2$Oil ratio of 200 to 800 $Nm^3$/kl to obtain a treated oil, and a step (III) wherein the treated oil obtained in the step (I) is mixed with the treated oil obtained in the step (II), and in this process, at least a part of a gas containing unreacted hydrogen in the step (II) is used for the hydrodesulfurization of the step (I).

6 Claims, 3 Drawing Sheets

METHOD OF DESULFURIZING GAS OIL FRACTION, DESULFURIZED GAS OIL, AND DESULFURIZER FOR GAS OIL FRACTION

FIELD OF THE INVENTION

The present invention relates to a process and an apparatus for desulfurizing a gas oil. More particularly, the invention relates to a process and an apparatus for highly desulfurizing a gas oil economically by hydrodesulfurizing a high-boiling gas oil fraction and a low-boiling gas oil fraction separately and mixing them.

BACKGROUND OF THE INVENTION

In recent years, influences on environment (environmental pollution) by nitrogen oxide (NOx), sulfur oxide (SOx) and particulate substances in exhaust, gas from diesel powered automobiles have become problems. In order to reduce nitrogen oxide and sulfur oxide in the exhaust gas, quality standard to lower the sulfur content in diesel gas oil to not more than 0.05% by weight (500 ppm) is laid down. Under such circumstances, production of very highly desulfurized gas oil having further decreased sulfur content is desired.

As shown in FIG. 3, a gas oil used for diesel oil or the like is usually produced by a process comprising preheating a gas oil fraction together with hydrogen in a furnace before desulfurization, then introducing the gas oil fraction into a hydrodesulfurization unit containing a catalyst and hydrodesulfurizing the gas oil fraction. In order to further reduce the sulfur concentration in this process, it is necessary to make the reaction conditions severe, for example, the reaction temperature of the desulfurization reaction is raised or the reaction time is prolonged. However, if high-degree desulfurization is carried out under such severe reaction conditions, there are problems that coloring of the resulting product gas oil takes place, the catalyst life is shortened, and the catalyst volume is increased.

As a means to solve the problems, the present applicant has found that a low-sulfur content desulfurized gas oil having a sulfur content of about 0.05% by weight can be efficiently produced by a process comprising fractionating a starting gas oil into plural fractions, subjecting each fraction to desulfurization and then mixing the fractions, and the process has already been proposed (see Japanese Patent Publication No. 49873/1994).

Under such circumstances, the present applicant has earnestly studied a process for economically producing a gas oil having a further decreased sulfur content, and as a result, he has found that a highly desulfurized gas oil can be produced economically and efficiently by fractionating a starting gas oil into a low-boiling fraction and a high-boiling fraction, then treating each of the fractions in a specific $H_2$/Oil ratio and using an unreacted portion of hydrogen, which has been used in the hydrodesulfurization of the high-boiling fraction, for the hydrodesulfurization of the low-boiling fraction. Thus, the present invention has been accomplished.

It is an object of the invention to provide a process for desulfurizing a gas oil fraction, by which the amount of the catalyst used can be decreased to thereby produce a desulfurized gas oil economically and efficiently, a desulfurized gas oil and an apparatus for desulfurizing a gas oil fraction.

SUMMARY OF THE INVENTION

The process for desulfurizing a gas oil fraction according to the invention is a process comprising:

a low-boiling gas oil fraction hydrodesulfurization step (I) wherein a low-boiling gas oil fraction obtained by fractionating a gas oil fraction into two fractions at a cut point t° C. (with the proviso that the cut point satisfies the expression of $280 \leq t \leq 360$ (° C.)) is hydrogenated under the condition of a $H_2$/Oil ratio of 70 to 200 $Nm^3$/kl to obtain a treated oil, a high-boiling gas oil fraction hydrodesulfurization step (II) wherein a high-boiling gas oil fraction obtained by fractionating a gas oil fraction into two fractions at a cut point t° C. is desulfurized under the condition of a $H_2$/Oil ratio of 200 to 800 $Nm^3$/kl to obtain a treated oil, and a step (III) wherein the treated oil obtained in the step (I) is mixed with the treated oil obtained in the step (II), wherein at least a part of a gas containing unreacted hydrogen in the step (II) is used for the hydrodesulfurization of the step (I).

In the above process for desulfurizing a gas oil fraction, it is also preferable that at least a part of a gas containing unreacted hydrogen in the low-boiling gas oil fraction hydrodesulfurization step (I) is used for the hydrodesulfurization of the high-boiling gas oil fraction hydrodesulfurization step (II) after removal of hydrogen sulfide.

The desulfurized gas oil according to the invention is produced by the above-mentioned process for desulfurizing a gas oil fraction.

The apparatus for desulfurizing a gas oil fraction according to the invention has:

a low-boiling gas oil fraction hydrodesulfurization means (a) for desulfurizing a low-boiling gas oil fraction obtained by fractionating a gas oil fraction into two fractions at a cut point t° C. (with the proviso that the cut point satisfies the expression of $280 \leq t \leq 360$ (° C.)), a high-boiling gas oil fraction hydrodesulfurization means (b) for desulfurizing a high-boiling gas oil fraction obtained by fractionating a gas oil fraction into two fractions at a cut point t° C., a means (c) for mixing a treated oil obtained from the low-boiling gas oil fraction hydrodesulfurization means (a) with a treated oil obtained from the high-boiling gas oil fraction hydrodesulfurization means (b), and a means (d) for introducing at least a part of a gas containing unreacted hydrogen discharged from the high-boiling gas oil fraction hydrodesulfurization means (b) into the low-boiling gas oil fraction hydrodesulfurization means (a).

The apparatus for desulfurizing a gas oil fraction according to the invention also preferably has:

a means (e) for removing hydrogen sulfide from at least a part of a gas containing unreacted hydrogen discharged from the low-boiling gas oil fraction hydrodesulfurization means (a), and a means (f) for introducing a gas containing hydrogen and substantially not containing hydrogen sulfide, said gas being obtained from the means (e), into the high-boiling gas oil fraction hydrodesulfurization means (b).

The second apparatus for desulfurizing a gas oil fraction according to the invention comprises:

a desulfurizing tower having:

a low-boiling gas oil fraction hydrodesulfurization section for desulfurizing a low-boiling gas oil fraction, a high-boiling gas oil fraction hydrodesulfurization section for desulfurizing a high-boiling gas oil fraction, and a means for introducing a gas containing hydrogen into the low-boiling gas oil fraction hydrodesulfurization section from the high-boiling gas oil fraction hydrodesulfurization section, and a means for mixing a desulfurized low-boiling gas oil fraction obtained from the desulfurizing tower with a desulfurized high-boiling gas oil fraction obtained from the desulfurizing tower.

DETAILED DESCRIPTION OF THE PREFERRED EMBODIMENTS

Figure 1:
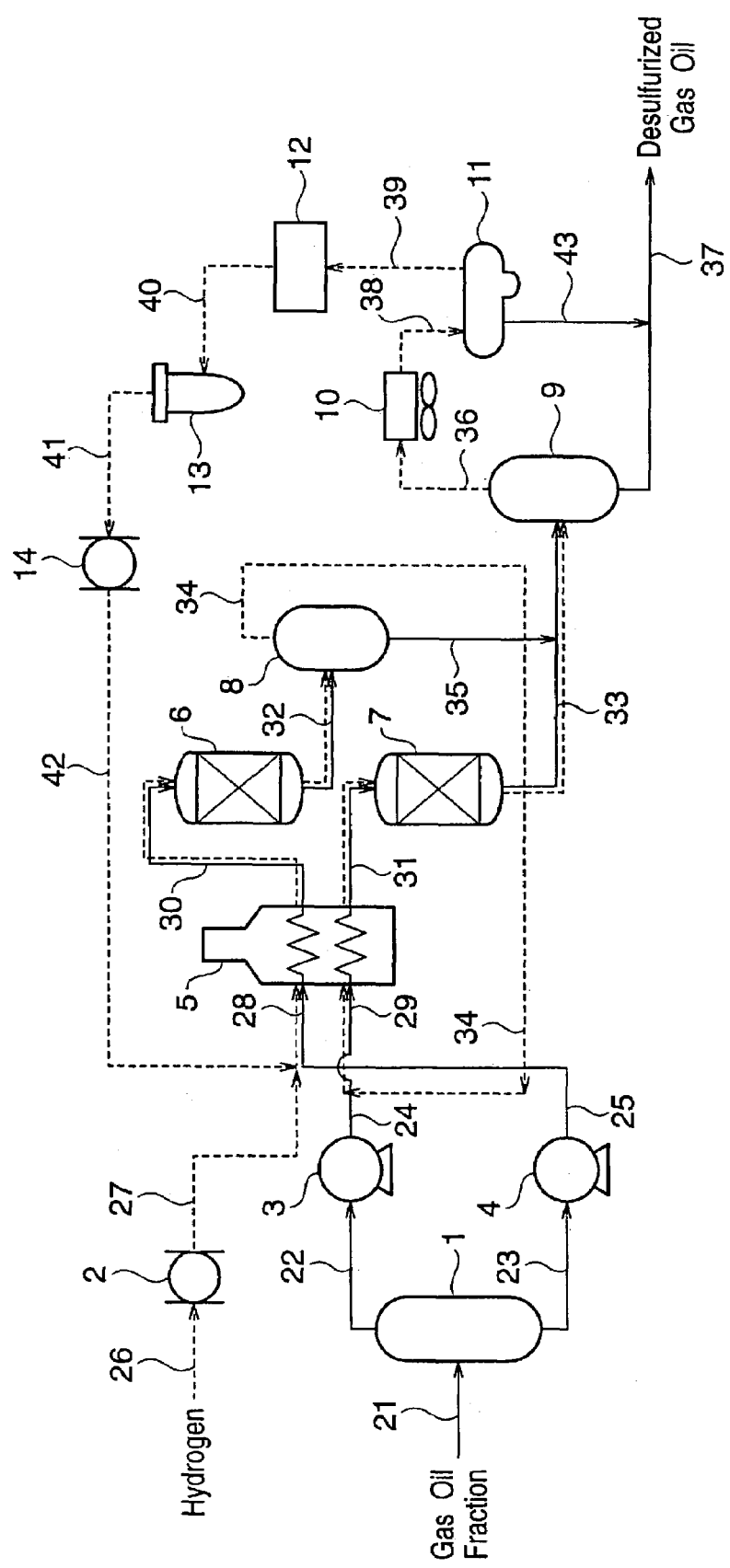
FIG. 1 is a schematic view showing steps of Example 1.

The present invention is described in detail hereinafter.

Process for Desulfurizing Gas Oil Fraction

In the process for desulfurizing a gas oil fraction according to the invention, a low-boiling gas oil fraction obtained by fractionating a gas oil fraction into two fractions at a cut point t° C. (with the proviso that the cut point satisfies the expression of $280 \leq t \leq 360$, preferably $300 \leq t \leq 340$ (° C.)), i.e., a low-boiling gas oil fraction having an end point of not higher than t° C., and a high-boiling gas oil fraction obtained by fractionating a gas oil fraction into two fractions at a cut point t° C., i.e., a high-boiling gas oil fraction having an initial boiling point of not lower than t° C., are used as starting oils.

The low-boiling gas oil fraction and the high-boiling gas oil fraction may be those obtained as a low-boiling gas oil fraction and a high-boiling gas oil fraction separated from the beginning in the course of atmospheric distillation of a crude oil or may be those obtained by fractionating a gas oil fraction containing a low-boiling gas oil fraction and a high-boiling gas oil fraction at a cut point of t° C.

When the gas oil fractions used as starting oils in the process for desulfurizing a gas oil fraction according to the invention are those obtained by fractionating a gas oil fraction containing a low-boiling gas oil fraction and a high-boiling gas oil fraction at a cut point of t° C., the gas oil fraction before the fractional distillation is not specifically limited, as far as the gas oil fraction has a boiling point of about 200 to 400° C., and any of various gas oil fractions such as straight-run gas oil, vacuum gas oil and cracked gas oil, gas oil fractions containing various gas oil fractions having been subjected to rough desulfurization in another process, and mixtures thereof can be preferably used. Of these, a straight-run gas oil or a gas oil fraction containing straight-run gas oil is particularly preferably used in the invention.

The process using, as starting oils, a low-boiling gas oil fraction and a high-boiling gas oil fraction obtained by fractional distillation of a gas oil fraction (containing a high-boiling gas oil fraction and a low-boiling gas oil fraction) is described below with reference to FIG. 1.

The gas oil fraction containing a low-boiling gas oil fraction and a high-boiling gas oil fraction is introduced into a fractional distillation device (1) through a line (21) and subjected to fractional distillation at a cut point t° C. (with the proviso that the cut point satisfies the expression of $280 \leq t \leq 360$, preferably $300 \leq t \leq 340$ (° C.)), whereby a low-boiling gas oil fraction having a cut point t° C. is obtained from the overhead of the fractional distillation device (1) and a high-boiling gas oil fraction having a cut point t° C. is obtained from the bottom of the fractional distillation device (1). Although the low-boiling gas oil fraction and the high-boiling gas oil fraction which become starting materials are not specifically limited, the weight ratio (low-boiling gas oil fraction:high-boiling gas oil fraction) is desired to be in the range of 9.5:0.5 to 5:5, preferably 8:2 to 6:4.

The low-boiling gas oil fraction obtained from the overhead of the fractional distillation device (1) is introduced into a furnace (5) through a line (22), a pump (3) and a line (24) together with the later-described recycle hydrogen from a line (34), heated to a hydrogenation temperature, and then introduced into a low-boiling gas oil fraction hydrodesulfurization device (7) through a line (31). The low-boiling gas oil fraction having been desulfurized by the low-boiling gas oil fraction hydrodesulfurization device (7) is obtained from a line (33) together with unreacted hydrogen.

The low-boiling gas oil fraction hydrodesulfurization device (7) has a hydrodesulfurization catalyst inside for carrying out hydrodesulfurization of the low-boiling gas oil fraction. As the hydrodesulfurization catalyst, any of catalysts hitherto used for hydrodesulfurization of kerosene and gas oil fractions is preferably used. For example, catalysts comprising silica or silica-alumina as a carrier and two or more metals selected from Ni, Co and Mo supported as sulfide on the carrier, such as catalysts of so-called Co—Mo type, Ni—Mo type and Ni—Co—Mo type, are preferably used. The catalyst used for the hydrodesulfurization of the low-boiling gas oil fraction may be a bifunctional catalyst using a zeolite catalyst together with the catalyst wherein two or more metals selected from Ni, Co and Mo are supported as a sulfided form on a silica or silica-alumina carrier.

The hydrodesulfurization of the low-boiling gas oil fraction is desirably carried out under the condition of a $H_2$/Oil ratio of 70 to 200 $Nm^3$/kl, preferably 100 to 150 $Nm^3$/kl, more preferably 110 to 140 $Nm^3$/kl. The low-boiling gas oil fraction generally has a sulfur content lower than that of a high-boiling gas oil fraction and tends to be easily free from sulfur, so that sufficient desulfurization can be carried out even under the condition of a lower $H_2$/Oil ratio than that for the later-described hydrodesulfurization of a high-boiling gas oil fraction. In the hydrodesulfurization of the low-boiling gas oil fraction, a $H_2$/Oil ratio of not less than 70 $Nm^3$/kl is preferable because sufficient desulfurization is feasible, and a $H_2$/Oil ratio of not more than 200 $Nm^3$/kl is preferable because of economical advantage.

Although the pressure condition in the hydrodesulfurization of the low-boiling fraction is not specifically limited, the pressure is desired to be in the range of usually about 30 to 70 $kg/cm^2G$, preferably about 40 to 60 $kg/cm^2G$.

The liquid hourly space velocity (LHSV) of the low-boiling gas oil fraction in the hydrodesulfurization of the low-boiling gas oil fraction depends upon the type of the catalyst used, the temperature condition, etc., and is not specifically limited, however, the LHSV is desired to be in the range of usually about 1.5 to 4 $hr^{-1}$, preferably about 2 to 3 $hr^{-1}$.

In the hydrogenation of the low-boiling gas oil fraction, recycle hydrogen, which is unreacted hydrogen having been used for the later-described hydrogenation of a high-boiling gas oil fraction fed from the line (34), is used. As the recycle hydrogen, the unreacted hydrogen having been used for the hydrodesulfurization of a high-boiling gas oil fraction may be used as it is or may be used after hydrogen sulfide removal treatment such as amine treatment. If necessary, a hydrogen gas (make-up hydrogen) other than the recycle hydrogen may be used in combination.

Thus, the low-boiling gas oil fraction hydrodesulfurization step (I) in the desulfurization process of the invention can be carried out.

On the other hand, the high-boiling gas oil fraction obtained from the bottom of the fractional distillation device (1) is introduced into the furnace (5) through a line (23), a pump (4), a line (25) and a line (28). In the line (28), high-purity hydrogen (make-up hydrogen) introduced through a line (26), a compressor (2) and a line (27) and recycle hydrogen having been free from hydrogen sulfide introduced from the line (42) are mixed with the high-boiling gas oil fraction. The high-boiling gas oil fraction is heated to a hydrogenation temperature together with hydrogen in the furnace (5), then introduced into a high-boiling gas oil fraction hydrodesulfurization device (6) through a line (30), and desulfurized. The thus treated oil is obtained from a line (32) together with the unreacted hydrogen.

The high-boiling gas oil fraction hydrodesulfurization device (6) has a hydrodesulfurization catalyst inside for carrying out hydrodesulfurization of a high-boiling gas oil fraction. As the hydrodesulfurization catalyst, any of catalysts hitherto used for hydrodesulfurization of kerosene and gas oil fractions is preferably used, similarly to the aforesaid hydrodesulfurization catalyst used in the low-boiling gas oil fraction hydrodesulfurization device (7). For example, catalysts comprising silica or silica-alumina as a carrier and two or more metals selected from Ni, Co and Mo supported as a sulfided form on the carrier, such as catalysts of so-called Co—Mo type, Ni—Mo type and Ni—Co—Mo type, are preferably used. For the hydrodesulfurization of the high-boiling gas oil fraction, a bifunctional catalyst comprising the catalyst wherein two or more metals selected from Ni, Co and Mo are supported as a sulfided form on a silica or silica-alumina carrier and a zeolite catalyst is more preferably used. Examples of the zeolite catalysts to constitute the bifunctional catalyst include ZSM-5, Y type zeolite and mordenite. The catalyst for the hydrodesulfurization of the high-boiling gas oil fraction may be used singly or as an appropriate mixture of two or more kinds, and the catalyst may be the same as or different from the catalyst for the aforesaid hydrodesulfurization of the low-boiling gas oil fraction. If the catalyst used for the hydrodesulfurization of the high-boiling gas oil fraction is the same as the catalyst used for the hydrodesulfurization of the low-boiling gas oil fraction, make-up (additional feeding), change, control, etc. of the catalyst are easily carried out. Hence, such a case is preferable.

The hydrodesulfurization of the high-boiling gas oil fraction is desirably carried out under the condition of a $H_2$/Oil ratio of 200 to 800 $Nm^3$/kl, preferably 300 to 600 $Nm^3$/kl, more preferably 350 to 550 $Nm^3$/kl. The high-boiling gas oil fraction generally has a higher sulfur content than that of the low-boiling gas oil fraction and tends to be hardly free from sulfur. Hence, it is desirable to carry out desulfurization under the condition of a higher $H_2$/Oil ratio than that for the hydrodesulfurization of the low-boiling gas oil fraction, and the desulfurization can be preferably carried out under the condition of a $H_2$/Oil ratio of 200 to 800 $Nm^3$/kl.

Although the pressure condition in the hydrodesulfurization of the high-boiling fraction is not specifically limited, the pressure is desired to be in the range of usually about 40 to 80 $kg/cm^2G$, preferably about 50 to 70 $kg/cm^2G$.

The liquid hourly space velocity (LHSV) of the high-boiling gas oil fraction in the hydrodesulfurization of the high-boiling gas oil fraction depends upon the type of the catalyst used, the temperature condition, etc., and is not specifically limited, however, the LHSV is desired to be in the range of usually about 0.3 to 3 $hr^{-1}$, preferably about 1 to 2 $hr^{-1}$.

As the hydrogen for the hydrodesulfurization of the high-boiling gas oil fraction, only a high-purity hydrogen gas (make-up hydrogen) introduced from the outside of the system through the line (26), the compressor (2) and the line (27) may be used, or both of the make-up hydrogen from the outside and the recycle hydrogen having been free from hydrogen sulfide introduced from the line (42) may be used. However, it is preferable to use hydrogen of high purity. More specifically, the hydrogen gas (total in case of mixing two or more kinds of hydrogen gases) to be mixed with the high-boiling gas oil fraction before introduction into the high-boiling gas oil fraction hydrodesulfurization device (6) is desired to have high purity, and the hydrogen content in the hydrogen gas to be mixed with the high-boiling gas oil fraction is desired to be not less than 90% by mol, preferably not less than 93% by mol, more preferably not less than 95% by mol.

In the present invention, the hydrogen gas for use in the hydrodesulfurization of the high-boiling gas oil fraction preferably has hydrogen purity higher than that of the hydrogen gas for use in the hydrodesulfurization of the low-boiling gas oil fraction.

The hydrogen gas to be mixed with the high-boiling gas oil fraction is desired to have a hydrogen sulfide content of not more than 2% by mol, preferably not more than 0.5% by mol, more preferably not more than 0.1% by mol, and it is particularly preferable that the hydrogen gas does not substantially contain hydrogen sulfide. When the unreacted hydrogen having been used in the hydrodesulfurization of the high-boiling gas oil fraction and/or the low-boiling gas oil fraction is recycled and used in the hydrodesulfurization of the high-boiling gas oil fraction, it is desirable to use a hydrogen gas which has been satisfactorily free from hydrogen sulfide (formed by the hydrodesulfurization) by a hydrogen sulfide removal means such as an amine treatment device.

The treated oil, which has been desulfurized in the high-boiling gas oil fraction hydrodesulfurization device (6), is introduced into a gas-liquid separator (8) through a line (32) together with the unreacted hydrogen and hydrogen sulfide formed by the hydrogenation. From the overhead of the gas-liquid separator (8), a gas component containing the unreacted hydrogen and hydrogen sulfide formed by the hydrodesulfurization is obtained through a line (34), and from the bottom of the gas-liquid separator (8), a treated oil that is a desulfurized high-boiling gas oil fraction is obtained through a line (35).

Thus, the high-boiling gas oil fraction hydrodesulfurization step (II) in the desulfurization process of the invention can be carried out.

The gas, which contains the unreacted hydrogen as a main ingredient and hydrogen sulfide formed by the hydrodesulfurization, obtained from the gas-liquid separator (8) through the line (34) is used for the aforesaid hydrodesulfurization of the low-boiling gas oil fraction. The gas containing the unreacted hydrogen as a main ingredient may be introduced as it is into a flow path (24) of the low-boiling gas oil fraction as shown in FIG. 1, or may be introduced into the flow path of the low-boiling gas oil fraction after proper removal of hydrogen sulfide.

The treated oil, which is a desulfurized high-boiling gas oil fraction and is obtained from the gas-liquid separator (8) through the line (35), is combined and mixed with the treated oil, which is a desulfurized low-boiling gas oil fraction from the low-boiling gas oil fraction hydrodesulfurization device (7) through the line (33). Then, the mixture is introduced into a gas-liquid separator (9). Thus, the step (III) for mixing the treated oil obtained in the step (I) with the treated oil obtained in the step (II) in the desulfurization process of the invention is carried out. That is to say, into the gas-liquid separator (9) is introduced a mixed fluid consisting of a desulfurized oil of the low-boiling gas oil fraction, a desulfurized oil of the high-boiling gas oil fraction, and the unreacted hydrogen in the low-boiling gas oil fraction hydrodesulfurization step and hydrogen sulfide formed therein.

In the gas-liquid separator (9), the mixed fluid thus introduced is subjected to gas-liquid separation, and a desulfurized gas oil consisting of a desulfurized oil of the low-boiling gas oil fraction and a desulfurized oil of the high-boiling gas oil fraction is obtained as a liquid component through a line (37). The gas oil fraction accompanied by the gas component in the gas-liquid separator (9) is separated from the gas component in a gas-liquid separator (11), is then combined with the liquid component from the gas-liquid separator (9) through a line (43) and becomes a part of the desulfurized gas oil obtained through the line (37). The desulfurized gas oil obtained from the line (37) is a gas oil having been subjected to excellent hydrodesulfurization, and is a gas oil having been so highly desulfurized as to have a sulfur content of usually not more than 500 ppm, preferably not more than 50 ppm.

On the other hand, the gas component obtained from the gas-liquid separator (9) through a line (36) contains, as a main ingredient, the unreacted hydrogen in the low-boiling gas oil fraction hydrodesulfurization step and contains hydrogen sulfide formed in the low-boiling gas oil fraction hydrodesulfurization step. This gas component is introduced into a cooler (10) such as an air fin cooler through the line (36), cooled and then introduced into a hydrogen sulfide removal device (12) such as an amine treatment device through a line (38), a gas-liquid separator (11) and a line (39). In the hydrogen sulfide removal device, the hydrogen sulfide ingredient is removed from the gas.

The gas component obtained from the hydrogen sulfide removal device (12) through a line (40) is a gas containing hydrogen as a main ingredient and having been free from hydrogen sulfide, and is a high-purity hydrogen gas. This hydrogen gas passes through a gas-liquid separator (13), a line (41), a compressor (14) and a line (42), is then introduced and mixed, as recycle hydrogen, with the high-boiling gas oil fraction before hydrodesulfurization and is used for hydrodesulfurization reaction of the high-boiling gas oil fraction.

Figure 2:
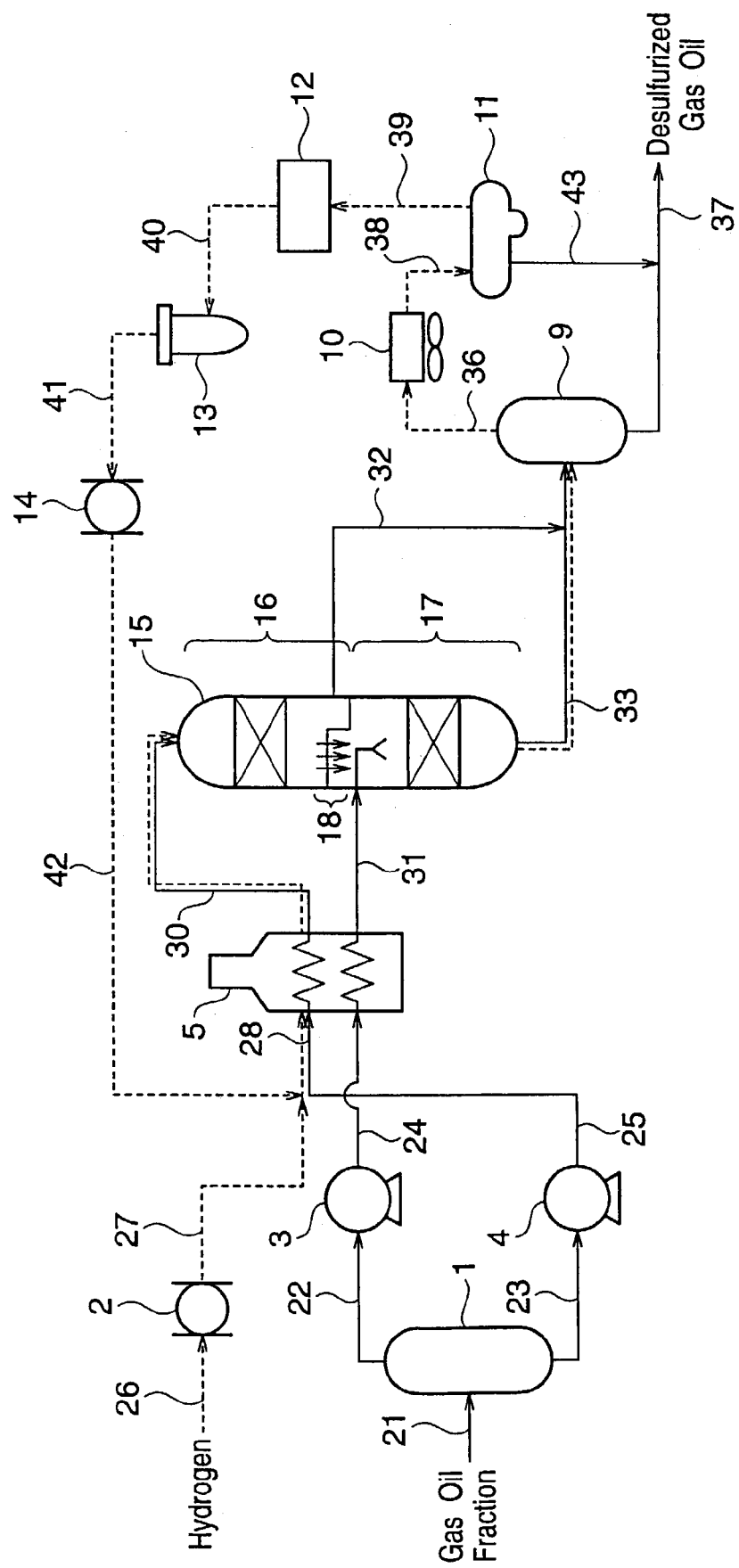
FIG. 2 is a schematic view showing steps of Example 4.

Although there is no specific limitation on the apparatus used in the process for desulfurizing a gas oil according to the invention, it is preferable to perform desulfurization by the first apparatus for desulfurizing a gas oil fraction according to the invention as shown in FIG. 1 which is described above in detail, or it is preferable to perform desulfurization by the second apparatus for desulfurizing a gas oil fraction according to the invention shown in FIG. 2 which will be described later.

According to the process for desulfurizing a gas oil fraction, the low-boiling gas oil fraction hydrodesulfurization step (I) and the high-boiling gas oil fraction hydrodesulfurization step (II) are each carried out in a specific $H_2$/Oil ratio respectively, and hence sufficient hydrodesulfurization can be made on each fraction with properly saving the amount of hydrogen used in the whole system. Further, at least a part of a gas containing the unreacted hydrogen in the hydrodesulfurization step (II) of the high-boiling gas oil fraction is used in the hydrodesulfurization step (I) of the low-boiling gas oil fraction, and hence the amount of hydrogen used in the whole system can be decreased, and hydrogen can be used efficiently. Furthermore, by sharing the hydrogen gas between the low-boiling gas oil fraction hydrodesulfurization step and the high-boiling gas oil fraction hydrodesulfurization step, the compressor for recycling the unreacted hydrogen can be shared, and hence, the equipment and energy can be saved, resulting in economical advantages, as compared with the case where hydrogen is independently recycled and used in each step.

In the process for desulfurizing a gas oil fraction according to the invention, moreover, the total amount of the catalyst used as a catalyst layer of the low-boiling gas oil fraction hydrodesulfurization device (7) and the catalyst used as a catalyst layer of the high-boiling gas oil fraction hydrodesulfurization device (6) can be made smaller, resulting in economical advantages, as compared with the case where the gas oil fraction is desulfurized all at once. In the present invention, the high-boiling gas oil fraction and the low-boiling gas oil fraction which are different in the desulfurization behavior can be each subjected to necessary and adequate desulfurization, and hence the catalyst can be used without futility.

In the present invention, still further, at least a part of the unreacted hydrogen having been used in the high-boiling gas oil fraction hydrodesulfurization step (II) is used in the low-boiling gas oil fraction hydrodesulfurization step (I), and hence the hydrogen to be mixed with the low-boiling gas oil fraction before hydrodesulfurization has a certain quantity of heat, and energy in the furnace can be reduced. In the invention, still further, at least a part of a gas containing the unreacted hydrogen in the low-boiling gas oil fraction hydrodesulfurization step is used in the high-boiling gas oil fraction hydrodesulfurization step (II), whereby hydrogen can be used more efficiently and the production cost of the desulfurized gas oil can be reduced.

The desulfurized gas oil of the invention is favorably produced at a low cost by the above-mentioned process for producing a desulfurized gas oil according to the invention, and the desulfurized gas oil can be favorably used as fuel for diesel powered automobiles and the like.

Apparatus for Desulfurizing Gas Oil Fraction

The first apparatus for desulfurizing a gas oil fraction according to the invention has:

a low-boiling gas oil fraction hydrodesulfurization means (a) for desulfurizing a low-boiling gas oil fraction obtained by fractionating a gas oil fraction into two fractions at a cut point t° C. (with the proviso that the cut point satisfies the expression of $280 \leq t \leq 360$ (° C.)), a high-boiling gas oil fraction hydrodesulfurization means (b) for desulfurizing a high-boiling gas oil fraction obtained by fractionating a gas oil fraction into two fractions at a cut point t° C., a means (c) for mixing a treated oil obtained from the low-boiling gas oil fraction hydrodesulfurization means (a) with a treated oil obtained from the high-boiling gas oil fraction hydrodesulfurization means (b), and a means (d) for introducing at least a part of a gas containing unreacted hydrogen discharged from the high-boiling gas oil fraction hydrodesulfurization means (b) into the low-boiling gas oil fraction hydrodesulfurization means (a).

For example, as shown in FIG. 1 which is previously described with respect to the process for desulfurizing a gas oil fraction, the apparatus specifically has:

a low-boiling gas oil fraction hydrodesulfurization device (7) as the low-boiling gas oil fraction hydrodesulfurization means (a) for desulfurizing a low-boiling gas oil fraction, a high-boiling gas oil fraction hydrodesulfurization device (6) as the high-boiling gas oil fraction hydrodesulfurization means (b) for desulfurizing a high-boiling gas oil fraction, a line (33) and a line (35) to combine the treated oils, as the means (c) for mixing the treated oil obtained from the low-boiling gas oil fraction hydrodesulfurization means (a) with the treated oil obtained from the high-boiling gas oil fraction hydrodesulfurization means (b), and a line (34) as the means (d) for introducing at least a part of a gas containing unreacted hydrogen discharged from the high-boiling gas oil fraction hydrodesulfurization means (b) into the low-boiling gas oil fraction hydrodesulfurization means (a).

According to the first apparatus of the invention for desulfurizing a gas oil fraction, the high-boiling gas oil fraction and the low-boiling gas oil fraction can be favorably desulfurized independently from each other, and besides the unreacted hydrogen discharged from the high-boiling gas oil fraction hydrodesulfurization means (b) can be effectively used in the low-boiling gas oil fraction hydrodesulfurization means (a). Moreover, the apparatus for desulfurizing a gas oil fraction according to the invention can be preferably used for the aforesaid process for desulfurizing a gas oil fraction according to the invention.

The first apparatus for desulfurizing a gas oil fraction according the invention preferably further has:

a means (e) for removing hydrogen sulfide from at least a part of a gas containing unreacted hydrogen discharged from the low-boiling gas oil fraction hydrodesulfurization means (a), and a means (f) for introducing a gas containing hydrogen and substantially not containing hydrogen sulfide, said gas being obtained from the means (e), into the high-boiling gas oil fraction hydrodesulfurization means (b).

For example, as shown in FIG. 1 which is previously described with respect to the process for desulfurizing a gas oil fraction, the apparatus specifically has:

a hydrogen sulfide removal device (12) such as an amine treatment device, as the means (e) for removing hydrogen sulfide, and a line (40), a gas-liquid separator (13), a line (41), a compressor (14) and a line (42), as the means (f) for introducing a gas containing hydrogen and substantially not containing hydrogen sulfide, said gas being obtained from the means (e), into the high-boiling gas oil fraction hydrodesulfurization means (b).

In the apparatus for desulfurizing a gas oil fraction, the unreacted hydrogen discharged from the low-boiling gas oil fraction hydrodesulfurization means (a) can be introduced into the high-boiling gas oil fraction hydrodesulfurization means (b) as hydrogen of high purity after removal of hydrogen sulfide. Hence, hydrodesulfurization of the high-boiling gas oil fraction can be achieved smoothly, and hydrogen present in the system can be more efficiently utilized, resulting in economical advantages.

Next, the second apparatus for desulfurizing a gas oil fraction according to the invention is described with refer ence to FIG. 2. The second apparatus for desulfurizing a gas oil fraction according to the invention comprises:

a desulfurizing tower (15) having:
a low-boiling gas oil fraction hydrodesulfurization section (17) for desulfurizing a low-boiling gas oil fraction,
a high-boiling gas oil fraction hydrodesulfurization section (16) for desulfurizing a high-boiling gas oil fraction, and
a means (18) for introducing a gas containing hydrogen into the low-boiling gas oil fraction hydrodesulfurization section from the high-boiling gas oil fraction hydrodesulfurization section, and
a means (32), (33) for mixing a desulfurized low-boiling gas oil fraction obtained from the desulfurizing tower with a desulfurized high-boiling gas oil fraction obtained from the desulfurizing tower.

Desulfurization of a gas oil fraction containing a low-boiling gas oil fraction and a high-boiling gas oil fraction using the second apparatus for desulfurizing a gas oil fraction according to the invention is described below in detail with reference to FIG. 2.

The gas oil fraction containing a low-boiling gas oil fraction and a high-boiling gas oil fraction is introduced into a fractional distillation device (1) through a line (21) and is subjected to fractional distillation, whereby a low-boiling gas oil fraction is obtained from a line (22) and a high-boiling gas oil fraction is obtained from a line (23), both of said gas oil fractions being used as starting oils.

The low-boiling gas oil fraction obtained as above is introduced into a furnace (5) through the line (22), a pump (3) and a line (24), heated to a hydrodesulfurization temperature, and then introduced into a low-boiling gas oil fraction hydrodesulfurization section (17) of a desulfurizing tower (15) through a line (31).

The high-boiling gas oil fraction obtained as above is introduced into the furnace (5) through the line (23), a pump (4), a line (25) and a line (28). In the line (28), high-purity hydrogen (make-up hydrogen) introduced through a line (26), a compressor (2) and a line (27) and recycle hydrogen introduced through a line (42), said recycle hydrogen having been free from hydrogen sulfide, are mixed with the high-boiling gas oil fraction. The high-boiling gas oil fraction introduced into the furnace (5) together with hydrogen is heated to a hydrodesulfurization temperature and then introduced into a high-boiling gas oil fraction hydrodesulfurization section (16) of the desulfurizing tower (15) through a line (30).

The desulfurizing tower (15) includes the high-boiling gas oil fraction hydrodesulfurization section (16) at the upper part and the low-boiling gas oil fraction hydrodesulfurization section (17) at the lower part, and each of the high-boiling gas oil fraction hydrodesulfurization section (16) and the low-boiling gas oil fraction hydrodesulfurization section (17) has a catalyst layer to desulfurize each gas oil fraction. This tower includes, between the high-boiling gas oil fraction hydrodesulfurization section (16) and the low-boiling gas oil fraction hydrodesulfurization section (17), a gas passageway (18) that is a means to introduce a hydrogen-containing gas present in the high-boiling gas oil fraction hydrodesulfurization section (16) into the low-boiling gas oil fraction hydrodesulfurization section (17). The gas passageway (18) is one through which a hydrogen-containing gas passes but the treated oil does not pass. Specifically, a chimney tray, a gas-permeable membrane or the like is adoptable.

The high-boiling gas oil fraction introduced together with the hydrogen gas into the high-boiling gas oil fraction hydrodesulfurization section (16) of the desulfurizing tower (15) through the line (30) is desulfurized by the catalyst layer of the high-boiling gas oil fraction hydrodesulfurization section (16), and the treated oil is obtained from the line (32). The gaseous component containing the unreacted hydrogen gas as a main ingredient and containing hydrogen sulfide formed by the hydrodesulfurization in the high-boiling gas oil fraction hydrodesulfurization section (16) is introduced into the low-boiling gas oil fraction hydrodesulfurization section (17) through the gas passageway (18).

The low-boiling gas oil fraction introduced into the low-boiling gas oil fraction hydrodesulfurization section (17) of the desulfurizing tower (15) through the line (31) is mixed with the hydrogen-containing gaseous component introduced from the high-boiling gas oil fraction hydrodesulfurization section (16) through the gas passageway (18), and then desulfurized by the catalyst layer of the low-boiling gas oil fraction hydrodesulfurization section (17). The mixed fluid containing the treated oil, i.e., desulfurized low-boiling gas oil fraction, unreacted hydrogen and hydrogen sulfide formed is obtained from the bottom of the desulfurizing tower through a line (33).

The line (33) is combined with the line (32), whereby the desulfurized low-boiling gas oil fraction and the desulfurized high-boiling gas oil fraction are mixed with each other. The fluid containing the desulfurized low-boiling gas oil fraction, the desulfurized high-boiling gas oil fraction, unreacted hydrogen and hydrogen sulfide formed is introduced into a gas-liquid separator (9). In the gas-liquid separator (9), the mixed fluid introduced is subjected to gas-liquid separation, and a desulfurized gas oil containing the desulfurized low-boiling gas oil fraction and the desulfurized high-boiling gas oil fraction is obtained as a liquid component through a line (37). The gas oil fraction accompanied by a gas component in the gas-liquid separator (9) is separated from the gas component in a gas-liquid separator (11), is then combined with the liquid component from the gas-liquid separator (9) through a line (43) and becomes a part of the desulfurized gas oil obtained through the line (37). The desulfurized gas oil obtained from the line (37) is a gas oil having been subjected to excellent hydrodesulfurization, and is a gas oil having been so highly desulfurized as to have a sulfur content of usually not more than 500 ppm, preferably not more than 50 ppm.

From the gas-liquid separator (9), a gas component containing unreacted hydrogen and hydrogen sulfide formed is obtained through a line (36). The hydrogen in the gas component is desired to be recycled into the system after removal of hydrogen sulfide. In this case, the gas component is introduced into a cooler (10) such as an air fin cooler from the line (36), cooled and then introduced into a hydrogen sulfide removal device (12) such as an amine treatment device through a line (38), the gas-liquid separator (11) and a line (39). In the hydrogen sulfide removal device, the hydrogen sulfide ingredient is removed from the gas.

The gas component obtained from the hydrogen sulfide removal device (12) through a line (40) is a gas containing hydrogen as a main ingredient and having been free from hydrogen sulfide, and is a high-purity hydrogen gas. This hydrogen gas passes through a gas-liquid separator (13), a line (41), a compressor (14) and a line (42), is then introduced and mixed, as recycle hydrogen, with the high-boiling gas oil fraction before hydrodesulfurization and can be used for hydrodesulfurization reaction of the high-boiling gas oil fraction.

Thus, the gas oil fraction can be favorably desulfurized using the second apparatus for desulfurizing a gas oil fraction according to the invention.

As the catalyst to constitute the catalyst layer of the high-boiling gas oil fraction hydrogenation section (16) and the catalyst layer of the low-boiling gas oil fraction hydrogenation section (17) in the desulfurizing tower (15), any of catalysts usually used for hydrodesulfurization of kerosene and gas oil fractions is preferably used. For example, catalysts comprising silica or silica-alumina as a carrier and two or more metals selected from Ni, Co and Mo supported as a sulfided form on the carrier, such as catalysts of so-called Co—Mo type, Ni—Mo type and Ni—Co—Mo type, are preferably used. The catalyst used for the hydrodesulfurization of the low-boiling gas oil fraction may be a bifunctional catalyst using a zeolite catalyst together with the catalyst wherein two or more metals selected from Ni, Co and Mo are supported as sulfide on a silica or silica-alumina carrier. The catalyst used for the catalyst layer of the high-boiling gas oil fraction hydrodesulfurization section (16) and the catalyst used for the catalyst layer of the low-boiling gas oil fraction hydrodesulfurization section (17) maybe the same or different.

In the use of the second apparatus for desulfurizing a gas oil fraction according to the invention, an unreacted portion of the hydrogen gas used for the hydrodesulfurization of the high-boiling gas oil fraction is directly used for the hydrodesulfurization of the low-boiling gas oil fraction in the desulfurizing tower (15). Hence, the difference between the reaction pressure in the hydrodesulfurization of the high-boiling gas oil fraction and the reaction pressure in the hydrodesulfurization of the low-boiling gas oil fraction can be made relatively small, and control of the apparatus can be facilitated.

Further, the desulfurization apparatus and the peripheral equipments such as lines can be reduced and the apparatus constitution can be simplified, as compared with the case where the low-boiling gas oil fraction and the high-boiling gas oil fraction are treated with individual hydrodesulfurization devices. Hence, the equipment cost, control of apparatus, labor of maintenance, apparatus area, etc. can be reduced, and a gas oil fraction can be highly desulfurized economically.

EXAMPLES

The present invention is further described with reference to the following examples, but it should be construed that the invention is in no way limited to these examples.

Example 1

A starting gas oil fraction shown in Table 1 was treated with the apparatus shown in FIG. 1.

First, the starting gas oil fraction having properties shown in Table 1 was introduced into the fractional distillation device (1) and fractionated into two fractions at a cut point 320° C. to obtain a low-boiling gas oil fraction and a high-boiling gas oil fraction. The amount of the resulting low-boiling gas oil fraction was 70% by volume based on the starting gas oil.

Then, the resulting high-boiling gas oil fraction was mixed with make-up hydrogen (hydrogen purity: 100%, flow rate: 55 Nl/hr) introduced from the line (26) and recycle hydrogen (hydrogen purity: 85%, flow rate 51 Nl/hr) from the line (42) under pressurizing by the compressor (14), then heated to a given temperature by the furnace (5) and introduced into the high-boiling gas oil fraction hydrodesulfurization device (6) by the pump (4) at a flow rate of 300 cc/hr (liquid hourly space velocity: 1.5 hr$^{-1}$), followed by hydrodesulfurization.

In the high-boiling gas oil fraction hydrogenation device (6), 200 cc of a presulfided Co—Mo catalyst was previously placed as a catalyst layer. The temperature at the catalyst layer inlet of the high-boiling gas oil fraction hydrogenation device (6) was 350° C., and the pressure was 60 kg/cm$^2$G.

Then, the hydrodesulfurization product discharged from the bottom of the high-boiling gas oil fraction hydrodesulfurization device (6) through the line (32) was introduced into the gas-liquid separator (8) and separated into a gas containing hydrogen as a main ingredient and a hydrogenated high-boiling gas oil.

The low-boiling gas oil fraction obtained from the fractional distillation device (1) was mixed with the gas (hydrogen flow rate: 86 Nl/hr) containing hydrogen as a main ingredient, said gas having been separated by the gas-liquid separator (8), then heated to a given temperature by the furnace (5) and introduced into the low-boiling gas oil fraction hydrodesulfurization device (7) by the pump (3) at a flow rate of 700 cc/hr (liquid hourly space velocity: 2.0 hr$^{-1}$), followed by hydrodesulfurization.

In the low-boiling gas oil fraction hydrodesulfurization device (7), 350 cc of a presulfided Co—Mo catalyst was previously placed as a catalyst layer. The temperature at the catalyst layer inlet of the low-boiling gas oil fraction hydrodesulfurization device (7) was 350° C., and the pressure was 50 kg/cm$^2$G.

The hydrodesulfurization product discharged from the bottom of the low-boiling gas oil fraction hydrodesulfurization device (7) through the line (33) was mixed with the desulfurized high-boiling gas oil from the line (35) and then separated into a gas component containing hydrogen as a main ingredient and a desulfurized oil by the gas-liquid separator (9).

The gas component containing hydrogen as a main ingredient, said gas component having been separated by the gas-liquid separator (9), was removed hydrogen sulfide therefrom to a hydrogen sulfide concentration of not more than 0.1% by the hydrogen sulfide removal device (12) and then used as recycle hydrogen for the high-boiling gas oil fraction hydrodesulfurization. The gas oil fraction accompanied by the gas component in the gas-liquid separator (9) was separated from a gas by the gas-liquid separator (11) and combined as a liquid component with the desulfurized oil obtained from the gas-liquid separator (9). The thus combined desulfurized oil was obtained from the line (37) as a product desulfurized gas oil. The sulfur concentration of the product desulfurized gas oil obtained from the line (37) was 50 ppm by weight.

A part of the desulfurized high-boiling gas oil in the line (32) and a part of the desulfurized low-boiling gas oil in the line (33) were each drawn out and measured on the sulfur concentration.

The treatment conditions (reaction conditions) of the high-boiling gas oil fraction hydrodesulfurization and the low-boiling gas oil fraction hydrodesulfurization, and the results of measurements of sulfur concentrations of the desulfurized oils are set forth in Table 2.

TABLE 1

| Properties of starting gas oil fraction | |
|---|---|
| Density (@15° C.) (cc/g) | 0.865 |
| Sulfur concentration (wt. %) | 1.15 |
| Nitrogen concentration (wt. %) | 0.01 |
| Distillation properties (° C.) | |
| Initial boiling point | 210 |
| 5% | 245 |
| 10% | 255 |
| 30% | 280 |
| 50% | 298 |
| 70% | 320 |
| 90% | 352 |
| 95% | 367 |
| End point | 378 |

TABLE 2

| (Example 1) | | | | |
|---|---|---|---|---|
| | | Hydrodesulfurization of high-boiling gas oil fraction | Hydrodesulfurization of low-boiling gas oil fraction | Whole apparatus |
| Treatment conditions | Oil flow rate (cc/h) | 300 | 700 | 1000 |
| | Reaction temperature (° C.) | 350 | 350 | — |
| | Reaction pressure (kg/cm$^2$G) | 60 | 50 | — |
| | H$_2$/Oil ratio (Nl/l) | 350 | 122 | — |
| | LHSV (1/hr) | 1.5 | 2.0 | — |
| | Catalyst amount (cc) | 200 | 350 | 550 |
| | Make-up hydrogen flow rate (Nl/hr) | 55 | — | 55 |
| | Recycle hydrogen flow rate (Nl/hr) | 51 | — | 51 |
| Sulfur concentration of hydrogenated oil (wt. ppm) | | 103 | 27 | — |
| Sulfur concentration of product desulfurized gas oil (wt. ppm) | | — | — | 50 |

Comparative Example 1

Figure 3:
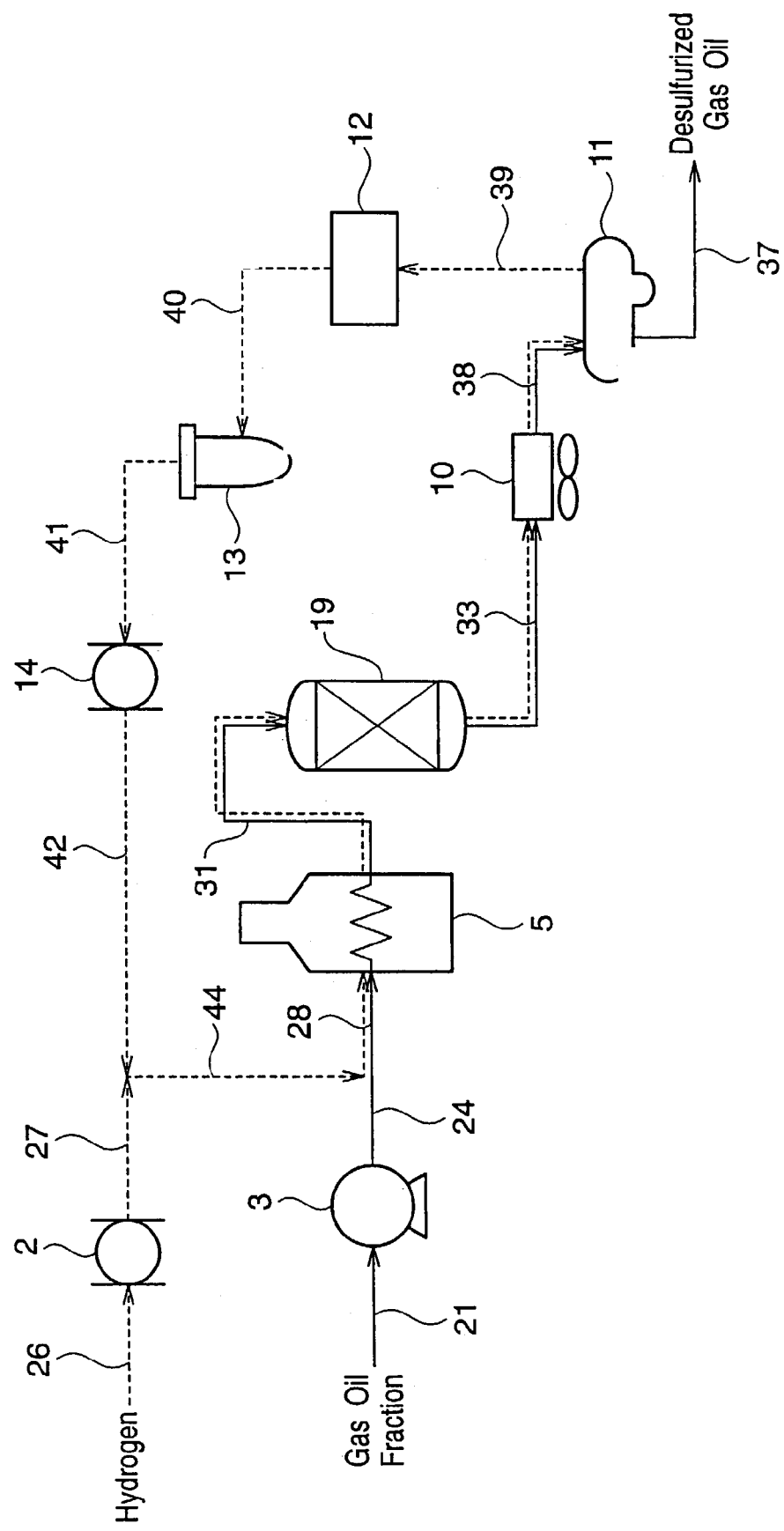
FIG. 3 is a schematic view showing steps of Comparative Example 1.

The starting gas oil fraction used in Example 1 was treated with the apparatus shown in FIG. 3 without fractional distillation of the gas oil fraction into a low-boiling gas oil fraction and a high-boiling gas oil fraction.

First, a hydrogen gas from the line (44), said gas being a combined gas of make-up hydrogen (hydrogen purity: 100%, flow rate: 60 Nl/hr) introduced from the line (26) and recycle hydrogen (hydrogen purity: 85%, flow rate: 140 Nl/hr) from the line (42) under pressurizing by the compressor (14), was mixed with the starting gas oil, and the mixture was heated to a given temperature by the furnace (5) and introduced into the gas oil fraction hydrodesulfurization device (19) by the pump (3) at a flow rate of 1000 cc/hr (liquid hourly space velocity: 1.43 hr$^{-1}$), followed by hydrodesulfurization.

In the gas oil fraction hydrodesulfurization device (19), 700 cc of a presulfided Co—Mo catalyst was previously placed as a catalyst layer. The temperature at the catalyst layer inlet of the gas oil fraction hydrodesulfurization device (19) was 350° C., and the pressure was 60 kg/cm$^2$G.

Then, the hydrodesulfurization product discharged from the bottom of the gas oil fraction hydrodesulfurization device (19) through the line (33) was introduced into the gas-liquid separator (11) and separated into a gas containing hydrogen as a main ingredient and a desulfurized gas oil by the gas-liquid separator (11). The gas containing hydrogen as a main ingredient, said gas having been separated by the gas-liquid separator (11), was removed hydrogen sulfide therefrom to a hydrogen sulfide concentration of not more than 0.1% by the hydrogen sulfide removal device (12) and then used as the aforesaid recycle hydrogen. The desulfurized gas oil separated by the gas-liquid separator (11) was obtained from the line (37) as a desulfurized gas oil. The sulfur concentration of the desulfurized gas oil obtained from the line (37) was 50 ppm by weight.

The treatment conditions (reaction conditions) of the gas oil fraction hydrodesulfurization and the result of measurement of sulfur concentration of the desulfurized gas oil are set forth in Table 3.

TABLE 3

(Comparative Example 1)

| Hydrodesulfurization conditions | |
|---|---|
| Oil flow rate (cc/hr) | 1000 |
| Reaction temperature (° C.) | 350 |
| Reaction pressure (kg/cm$^2$G) | 60 |
| H$_2$/Oil ratio (Nl/l) | 200 |
| LHSV (1/hr) | 1.4 |
| Catalyst amount (cc) | 700 |
| Make-up hydrogen flow rate (Nl/hr) | 60 |
| Recycle hydrogen flow rate (Nl/hr) | 140 |
| Sulfur concentration of desulfurized gas oil (wt. ppm) | 50 |

Comparative Example 2

The starting gas oil fraction was fractionated into two fractions at a cut point 320° C. in the same manner as in Example 1 to obtain a low-boiling gas oil fraction and a high-boiling gas oil fraction. The amount of the resulting low-boiling gas oil fraction was 70% by volume based on the starting gas oil.

The low-boiling gas oil fraction and the high-boiling gas oil fraction obtained above were separately treated with the apparatus shown in FIG. 3 to produce a low-boiling desulfurized gas oil and a high-boiling desulfurized gas oil. Then, the low-boiling desulfurized gas oil and the high-boiling hydrogenated gas oil were mixed to obtain a desulfurized gas oil.

The hydrodesulfurization conditions (reaction conditions) of the high-boiling gas oil fraction, the hydrodesulfurization conditions of the low-boiling gas oil fraction, sulfur concentrations of the desulfurized gas oils, and a sulfur concentration of the desulfurized gas oil are set forth in Table 4.

TABLE 4

(Comparative Example 2)

| | | Hydrodesulfurization of high-boiling gas oil fraction | Hydrodesulfurization of low-boiling gas oil fraction | Whole system |
|---|---|---|---|---|
| Treatment conditions | Oil flow rate (cc/h) | 300 | 700 | 1000 |
| | Reaction temperature (° C.) | 350 | 350 | — |
| | Reaction pressure (kg/cm$^2$G) | 60 | 50 | — |
| | H$_2$/Oil ratio (Nl/l) | 350 | 122 | — |
| | LHSV (1/hr) | 1.5 | 2 | — |
| | Catalyst amount (cc) | 200 | 350 | 550 |
| | Make-up hydrogen flow rate (Nl/hr) | 20 | 35 | 55 |
| | Recycle hydrogen flow rate (Nl/hr) | 86 | 50 | 136 |
| Sulfur concentration of hydrogenated oil (wt. ppm) | | 104 | 26 | — |
| Sulfur concentration of product desulfurized gas oil (wt. ppm) | | — | — | 50 |

Example 1 and Comparative Example 1 in which desulfurized gas oils having equivalent sulfur concentrations were produced were compared in the total amount of the catalyst used in the whole system. As a result, the total amount in Example 1 was 550 cc, while 700 cc was necessary in Comparative Example 1. The results of the comparison between Example 1 and Comparative Example 1 show that the amount of the catalyst used can be decreased by a process comprising subjecting the gas oil fraction to fractional distillation to give a low-boiling gas oil fraction and a high-boiling gas oil fraction, then desulfurizing those gas oil fractions separately and mixing the resulting desulfurized oils, and it can be seen that in Example 1 a desulfurized gas oil having a sulfur concentration of 50 ppm by weight could be produced economically in a small catalyst amount.

From the results of Example 1 and Comparative Example 2, the following can be seen. In Example 1 wherein an unreacted portion of hydrogen having been used in the high-boiling gas oil fraction hydrodesulfurization device is used in the low-boiling gas oil fraction hydrodesulfurization device, that is, recycle hydrogen is shared, the amount of hydrogen (recycle hydrogen) used in the whole system can be decreased, as compared with Comparative Example 2 wherein hydrogen is not shared, and hence burden on the hydrogen sulfide removal device, the pump, the compressor, etc. can be reduced, resulting in economical advantages. Further, it can be seen that in Example 1 wherein hydrogen is shared, equipments such as recycle compressor and hydrogen sulfide removal device can be reduced and the apparatus cost can be reduced, as compared with Comparative Example 2, and hence a desulfurized gas oil having a sulfur concentration of 50 ppm by weight can be obtained economically.

Example 2

The starting gas oil fraction used in Example 1 was treated with the apparatus shown in FIG. 1.

First, the starting gas oil fraction used in Example 1 and having properties shown in Table 1 was introduced into the fractional distillation device (1) and fractionated into two fractions at a cut point 347° C. to obtain a low-boiling gas oil fraction and a high-boiling gas oil fraction. The amount of the resulting low-boiling gas oil fraction was 80% by volume based on the starting gas oil.

Then, the resulting high-boiling gas oil fraction was mixed with make-up hydrogen (hydrogen purity: 100%, flow rate: 58 Nl/hr) introduced from the line (26) and recycle hydrogen (hydrogen purity: 85%, flow rate 54 Nl/hr) from the line (42) under pressurizing by the compressor (14), then heated to a given temperature by the furnace (5) and introduced into the high-boiling gas oil fraction hydrodesulfurization device (6) by the pump (4) at a flow rate of 200 cc/hr (liquid hourly space velocity: 0.5 hr$^{-1}$), followed by hydrodesulfurization.

In the high-boiling gas oil fraction hydrodesulfurization device (6), 400 cc of a presulfided Co—Mo catalyst was previously placed as a catalyst layer. The temperature at the catalyst layer inlet of the high-boiling gas oil fraction hydrodesulfurization device (6) was 355° C., and the pressure was 60 kg/cm$^2$G.

Then, the hydrodesulfurization product discharged from the bottom of the high-boiling gas oil fraction hydrodesulfurization device (6) through the line (32) was introduced into the gas-liquid separator (8) and separated into a gas containing hydrogen as a main ingredient and a desulfurized high-boiling gas oil.

The low-boiling gas oil fraction obtained from the fractional distillation device (1) was mixed with the gas (hydrogen flow rate: 98 Nl/hr) containing hydrogen as a main ingredient, said gas having been separated by the gas-liquid separator (8), then heated to a given temperature by the furnace (5) and introduced into the low-boiling gas oil fraction hydrodesulfurization device (7) by the pump (3) at a flow rate of 800 cc/hr (liquid hourly space velocity: 1.7 hr$^{-1}$), followed by hydrodesulfurization.

In the low-boiling gas oil fraction hydrodesulfurization device (7), 470 cc of a presulfided Co—Mo catalyst was previously placed as a catalyst layer. The temperature at the catalyst layer inlet of the low-boiling gas oil fraction hydrodesulfurization device (7) was 355° C., and the pressure was 50 kg/cm$^2$G.

The hydrodesulfurization product discharged from the bottom of the low-boiling gas oil fraction hydrodesulfurization device (7) through the line (33) was mixed with the desulfurized high-boiling gas oil from the line (35) and then separated into a gas component containing hydrogen as a main ingredient and a desulfurized oil by the gas-liquid separator (9).

The gas component containing hydrogen as a main ingredient, said gas component having been separated by the gas-liquid separator (9), was removed hydrogen sulfide therefrom to a hydrogen sulfide concentration of not more than 0.1% by the hydrogen sulfide removal device (12) and then used as recycle hydrogen for the high-boiling gas oil fraction hydrodesulfurization. The gas oil fraction accompanied by the gas component in the gas-liquid separator (9) was separated from a gas by the gas-liquid separator (11) and combined as a liquid component with the desulfurized oil obtained from the gas-liquid separator (9). The thus combined desulfurized oil was obtained from the line (37) as a product desulfurized gas oil. The sulfur concentration of the product desulfurized gas oil obtained from the line (37) was 10 ppm by weight.

A part of the desulfurized high-boiling gas oil in the line (32) and a part of the desulfurized low-boiling gas oil in the line (33) were each drawn out and measured on the sulfur concentration.

The treatment conditions (reaction conditions) of the high-boiling gas oil fraction hydrodesulfurization and the low-boiling gas oil fraction hydrodesulfurization, and the results of measurements of sulfur concentrations of the desulfurized oils are set forth in Table 5.

TABLE 5

| | | (Example 2) | | |
|---|---|---|---|---|
| | | Hydrodesulfurization of high-boiling gas oil fraction | Hydrodesulfurization of low-boiling gas oil fraction | Whole apparatus |
| Treatment conditions | Oil flow rate (cc/h) | 200 | 800 | 1000 |
| | Reaction temperature (° C.) | 355 | 355 | — |
| | Reaction pressure (kg/cm$^2$G) | 60 | 50 | — |
| | H$_2$/Oil ratio (Nl/l) | 560 | 122 | — |
| | LHSV (1/hr) | 0.5 | 1.7 | — |
| | Catalyst amount (cc) | 400 | 470 | 870 |
| | Make-up hydrogen flow rate (Nl/hr) | 58 | — | 58 |
| | Recycle hydrogen flow rate (Nl/hr) | 54 | — | 54 |
| Sulfur concentration of hydrogenated oil (wt. ppm) | | 10 | 10 | — |
| Sulfur concentration of product desulfurized gas oil (wt. ppm) | | — | — | 10 |

Comparative Example 3

The starting gas oil fraction used in Example 1 and having properties shown in Table 1 was fractionated into two fractions at a cut point 347° C. to obtain a low-boiling gas oil fraction and a high-boiling gas oil fraction. The amount of the resulting low-boiling gas oil fraction was 80% by volume based on the starting gas oil.

The low-boiling gas oil fraction and the high-boiling gas oil fraction obtained above were seperately treated with the apparatus shown in FIG. 3 in the same manner as in Comparative Example 2 to produce a low-boiling desulfurized gas oil and a high-boiling desulfurized gas oil. Then, the low-boiling desulfurized gas oil and the high-boiling desulfurized gas oil were mixed to obtain a desulfurized gas oil having a sulfur concentration of 10 ppm by weight.

The hydrodesulfurization conditions (reaction conditions) of the high-boiling gas oil fraction, the hydrodesulfurization conditions of the low-boiling gas oil fraction, sulfur concentrations of the desulfurized gas oils, and a sulfur concentration of the desulfurized gas oil are set forth in Table 6.

TABLE 6

(Comparative Example 3)

|  |  | Hydrodesulfurization of high-boiling gas oil fraction | Hydrodesulfurization of low-boiling gas oil fraction | Whole system |
|---|---|---|---|---|
| Treatment conditions | Oil flow rate (cc/h) | 200 | 800 | 1000 |
|  | Reaction temperature (° C.) | 355 | 355 | — |
|  | Reaction pressure (kg/cm$^2$G) | 60 | 50 | — |
|  | H$_2$/Oil ratio (Nl/l) | 350 | 122 | — |
|  | LHSV (1/hr) | 0.5 | 1.7 | — |
|  | Catalyst amount (cc) | 400 | 470 | 870 |
|  | Make-up hydrogen flow rate (Nl/hr) | 14 | 44 | 58 |
|  | Recycle hydrogen flow rate (Nl/hr) | 98 | 54 | 152 |
| Sulfur concentration of hydrogenated oil (wt. ppm) |  | 10 | 10 | — |
| Sulfur concentration of product desulfurized gas oil (wt. ppm) |  | — | — | 10 |

From the results of Example 2 and Comparative Example 3, the following can be seen. In Example 2 wherein an unreacted portion of hydrogen having been used in the high-boiling gas oil fraction hydrodesulfurization device is used in the low-boiling gas oil fraction hydrodesulfurization device, that is, recycle hydrogen is shared, the amount of hydrogen (recycle hydrogen) used in the whole system can be decreased, as compared with Comparative Example 3 wherein hydrogen is not shared, and hence burden on the hydrogen sulfide removal device, the pump, the compressor, etc. can be reduced, resulting in economical advantages. Further, it can be seen that in Example 2 wherein hydrogen is shared, equipments such as recycle compressor and hydrogen sulfide removal device can be reduced and the apparatus cost can be reduced, as compared with Comparative Example 3, and hence a desulfurized gas oil having a sulfur concentration of 10 ppm by weight can be obtained economically.

Example 3

Subsequently to the production of the desulfurized gas oil in Example 1, the operation was continuously carried out for 180 days.

With the operation, the activity of the catalyst is slowly lowered because of, for example, deposition of coke on the catalyst, so that the temperature at the catalyst layer inlet of the high-boiling gas oil fraction hydrodesulfurization device and the temperature at the catalyst layer inlet of the low-boiling gas oil fraction hydrodesulfurization device were slowly raised so as to keep the sulfur concentration of the hydrodesulfurization product measured at the beginning of the operation. The control of the temperature at the catalyst layer inlet was carried out by controlling quantity of heat applied to the fluid in the furnace.

Over a period of 180 days, the sulfur concentration of the desulfurized high-boiling gas oil fraction and the sulfur concentration of the desulfurized low-boiling gas oil fraction were controlled to 103 ppm by weight and 27 ppm by weight, respectively, which were almost the same as those measured at the beginning of the operation. As a result, on the 180th day, the temperature at the catalyst layer inlet of the high-boiling gas oil fraction hydrodesulfurization device was 354.6° C., and the temperature at the catalyst layer inlet of the low-boiling gas oil fraction hydrodesulfurization device was 352.6° C.

Comparative Example 4

Subsequently to the production of the desulfurized gas oil in Comparative Example 2, the operation was continuously carried out for 180 days.

With the operation, the activity of the catalyst is slowly lowered because of, for example, deposition of coke on the catalyst, so that the temperature at the catalyst layer inlet of each gas oil fraction hydrodesulfurization device was slowly raised so as to keep the sulfur concentration of the hydrodesulfurization product measured at the beginning of the operation. The control of the temperature at the catalyst layer inlet was carried out by controlling quantity of heat applied to the fluid in the furnace.

Over a period of 180 days, the sulfur concentration of the desulfurized high-boiling gas oil fraction and the sulfur concentration of the desulfurized low-boiling gas oil fraction were controlled to 104 ppm by weight and 26 ppm by weight, respectively, which were almost the same as those measured at the beginning of the operation. As a result, on the 180th day, the temperature at the catalyst layer inlet of the hydrogenation device for the high-boiling gas oil fraction was 358.6° C., and the temperature at the catalyst layer inlet of the hydrodesulfurization device for the low-boiling gas oil fraction was 352.6° C.

From the results of Example 3 and Comparative Example 4, the following can be seen. In the hydrodesulfurization of the low-boiling gas oil fraction, there was no considerable difference between Example 3 and Comparative Example 4 in the change with time of the temperature at the catalyst layer inlet. In the hydrodesulfurization of the high-boiling gas oil fraction, however, the reaction temperature in Comparative Example 4 was much higher than that in Example 3. From this, deterioration of the catalyst used in the high-boiling gas oil fraction hydrodesulfurization device was found to be greater in Comparative Example 4 than in Example 3.

From the above results, it can be seen that deterioration of the catalyst can be reduced by the use of the unreacted portion of hydrogen, which has been used in the high-boiling gas oil fraction hydrodesulfurization device, in the low-boiling gas oil fraction hydrodesulfurization device, that is, by sharing the recycle hydrogen and introducing the make-up hydrogen to the high-boiling gas oil fraction hydrodesulfurization device, as described in Example 3, and that such a process is advantageous. The reason why such effects are exerted is presumably that the proportion of the make-up hydrogen to the hydrogen (total of make-up hydrogen and recycle hydrogen) fed to the hydrodesulfurization device for the high-boiling gas oil fraction in Example 3 is larger than that in Comparative Example 4, and the hydrogen purity is higher in Example 3, so that the hydrodesulfurization reaction proceeds more smoothly to thereby restrain deposition of coke on the hydrodesulfurization catalyst for the high-boiling gas oil fraction.

Thus, from the results of Example 3 and Comparative Example 4, it can be seen that when hydrogen is shared and recycled to produce a desulfurized gas oil, the catalyst life can be made longer than the production without sharing hydrogen, and thereby the desulfurized high-boiling gas oil can be produced for a long period of time, resulting in economical advantages.

Example 4

The starting gas oil fraction used in Example 1 was treated with the apparatus shown in FIG. 2, said apparatus including a desulfurizing tower (15) having a high-boiling gas oil fraction hydrodesulfurization section (16) and a low-boiling gas oil fraction hydrodesulfurization section (17).

In the high-boiling gas oil fraction hydrodesulfurization section (16) located at the upper part of the desulfurizing tower (15), 200 cc of a presulfided Co—Mo catalyst was previously placed as a catalyst layer, and in the low-boiling gas oil fraction hydrodesulfurization section (17) located at the lower part of the desulfurizing tower (15), 350 cc of a presulfided Co—Mo catalyst was previously placed as a catalyst layer. Between the high-boiling gas oil fraction hydrodesulfurization section (16) and the low-boiling gas oil fraction hydrodesulfurization section (17) of the desulfurizing tower (15), a chimney tray to pass therethrough a gaseous component of the high-boiling gas oil fraction hydrodesulfurization section (16) to the low-boiling gas oil fraction hydrodesulfurization section (17) was provided as a gas passageway (18).

First, the starting gas oil fraction used in Example 1 and having properties shown in Table 1 was introduced into the fractional distillation device (1) and fractionated into two fractions at a cut point 320° C. to obtain a low-boiling gas oil fraction and a high-boiling gas oil fraction. The amount of the resulting low-boiling gas oil fraction was 70% by volume based on the starting gas oil.

Then, the resulting high-boiling gas oil fraction was mixed with make-up hydrogen (hydrogen purity: 100%, flow rate: 57 Nl/hr) introduced from the line (26) and recycle hydrogen (hydrogen purity: 85%, flow rate 40 Nl/hr) from the line (42) under pressurizing by the compressor (14), then heated to a given temperature by the furnace (5) and introduced into the high-boiling gas oil fraction hydrodesulfurization section (16) located at the upper part of the desulfurizing tower (15) by the pump (4) at a flow rate of 300 cc/hr (liquid hourly space velocity: 1.5 hr$^{-1}$), followed by hydrodesulfurization. At this time, the temperature at the catalyst layer inlet of the high-boiling gas oil fraction hydrodesulfurization section (16) was 350° C., and the pressure at the same place was 60kg/cm$^2$G.

The hydrodesulfurization product in the high-boiling gas oil fraction hydrodesulfurization section (16) was discharged from the lower, place of said section through the line (32). The gaseous component containing the unreacted hydrogen in the high-boiling gas oil fraction hydrodesulfurization section (16) was introduced into the low-boiling gas oil fraction hydrodesulfurization section (17) through the gas passageway (18).

The low-boiling gas oil fraction obtained from the fractional distillation device (1) was heated to a given temperature by the furnace (5) and introduced into the low-boiling gas oil fraction hydrodesulfurization section (17) located at the lower part of the desulfurizing tower (15) at a flow rate of 700 cc/hr (liquid hourly space velocity: 2.0 hr$^{-1}$), followed by hydrodesulfurization. At this time, the temperature at the catalyst layer inlet of the low-boiling gas oil fraction hydrodesulfurization section (17) was 350° C.

The hydrodesulfurization product discharged from the lower place of the low-boiling gas oil fraction hydrodesulfurization section (17) through the line (33) was mixed with the desulfurized high-boiling gas oil fraction from the line (32) and then separated into a gas component containing hydrogen as a main ingredient and a desulfurized oil by the gas-liquid separator (9).

The gas component containing hydrogen as a main ingredient, said gas component having been separated by the gas-liquid separator (9), was removed hydrogen sulfide therefrom to a hydrogen sulfide concentration of not more than 0.1% by the hydrogen sulfide removal device (12) and then used as recycle hydrogen for the high-boiling gas oil fraction hydrodesulfurization. The gas oil fraction accompanied by the gas component in the gas-liquid separator (9) was separated from a gas by the gas-liquid separator (11) and combined as a liquid component with the desulfurized oil obtained from the gas-liquid separator (9). The thus combined desulfurized oil was obtained from the line (37) as a product desulfurized gas oil. The sulfur concentration of the product desulfurized gas oil obtained from the line (37) was 50 ppm by weight.

A part of the desulfurized high-boiling gas oil in the line (32) and a part of the desulfurized low-boiling gas oil in the line (33) were each drawn out and measured on the sulfur concentration.

The treatment conditions (reaction conditions) of the high-boiling gas oil fraction hydrodesulfurization and the low-boiling gas oil fraction hydrodesulfurization, and the results of measurements of sulfur concentrations of the desulfurized oils are set forth in Table 7.

TABLE 7

|  |  | (Example 4) | | |
|---|---|---|---|---|
|  |  | Hydrodesulfurization of high-boiling gas oil fraction | Hydrodesulfurization of low-boiling gas oil fraction | Whole apparatus |
| Treatment conditions | Oil flow rate (cc/h) | 300 | 700 | 1000 |
|  | Reaction temperature (° C.) | 350 | 350 | — |
|  | Reaction pressure (kg/cm$^2$G) | 60 | 60 | — |
|  | H$_2$/Oil ratio (Nl/l) | 322 | 110 | — |
|  | LHSV (1/hr) | 1.5 | 2 | — |
|  | Catalyst amount (cc) | 200 | 350 | 550 |
|  | Make-up hydrogen flow rate (Nl/hr) | 57 | — | 57 |
|  | Recycle hydrogen flow rate (Nl/hr) | 40 | — | 40 |
| Sulfur concentration of hydrogenated oil (wt. ppm) | | 105 | 25 | — |
| Sulfur concentration of product desulfurized gas oil (wt. ppm) | | — | — | 50 |

From the above results, it can be seen that efficient hydrodesulfurization could be carried out in Example 4 by the use of the apparatus shown in FIG. 2, similarly to Example 1. In Example 4, further, by the use of the apparatus shown in FIG. 2, the low-boiling gas oil fraction and the high-boiling gas oil fraction were treated at the same time with one desulfurizing tower. Hence, as compared with the case of using plural desulfurizers, the apparatus could be simplified, the equipment area could be reduced, peripheral equipments such as lines were unnecessary, and heat efficiency was excellent.

According to the process of the invention for desulfurizing a gas oil fraction, the low-boiling gas oil fraction hydrodesulfurization step (I) and the high-boiling gas oil fraction hydrodesulfurization step (II) are each carried out in a specific $H_2$/Oil ratio, and at least a part of a gas containing unreacted hydrogen in the high-boiling gas oil fraction hydrodesulfurization step (II) is used in the low-boiling gas oil fraction hydrodesulfurization step (I). Hence, the amount of hydrogen used in the whole system can be decreased, hydrogen and energy can be used efficiently, and besides sufficient hydrodesulfurization can be made on each fraction, whereby a highly desulfurized gas oil can be produced. According to the process of the invention, further, a gas oil fraction can be sufficiently desulfurized economically in a smaller catalyst amount, as compared with the case of hydrodesulfurization of a gas oil all at once.

The desulfurized gas oil of the invention is favorably produced at a low cost by the process for producing a desulfurized gas oil according to the invention, has a sufficiently reduced sulfur content and can be favorably used as fuel for diesel powered automobiles.

According to the invention, moreover, there can be provided an apparatus for desulfurizing a gas oil fraction, which is capable of using hydrogen and energy efficiently, capable of subjecting each fraction to sufficient hydrodesulfurization and capable of producing a highly desulfurized gas oil in a small catalyst amount.

According to the invention, additionally, there can be provided an excellent second apparatus for desulfurizing a gas oil fraction, which is capable of using a hydrogen gas and energy efficiently, capable of reducing desulfurization apparatus and peripheral equipments such as lines as compared with the case of treating the low-boiling gas oil fraction and the high-boiling gas oil fraction with separate hydrodesulfurization devices, capable of being simplified in its constitution, capable of reducing cost of equipment, control of apparatus, labor of maintenance, apparatus area, etc. and capable of highly desulfurizing a gas oil economically.

What is claimed is:

1. A process for desulfurizing a straight-run gas oil fraction, comprising:
   a low-boiling straight-run gas oil fraction hydrodesulfurization step (I) wherein a low-boiling straight-run gas oil fraction obtained by fractionating a straight-run gas oil fraction into two fractions at a cut point t° C. wherein the cut point satisfies the expression of $280 \leq t \leq 360$ (° C.) is desulfurized under the conditions of a $H_2$/Oil ratio of 70 to 200 Nm³/kl and a total pressure of 30 to 70 kg/cm²G to obtain a treated oil,
   a high-boiling straight-run gas oil fraction hydrodesulfurization step (II) wherein a high-boiling straight-run gas oil fraction obtained by fractionating a straight-run gas oil fraction into two fractions at a cut point t° C. is desulfurized under the conditions of a $H_2$/Oil ratio of 200 to 800 Nm³/kl and a total pressure of 40 to 80 kg/cm²G to obtain a treated oil, and
   a step (III) wherein the treated oil obtained in the step (I) is mixed with the treated oil obtained in the step (II) to obtain the treated oil having a sulfur content of not more than 50 ppm,
   wherein at least a part of a gas containing unreacted hydrogen in the step (II) is used for the hydrodesulfurization of the step (I), and
   wherein unreacted hydrogen in the step (I) is not directly used for hydrodesulfurization of the step (II).

2. The process for desulfurizing a straight-run gas oil fraction as claimed in claim 1, wherein at least a part of a gas containing unreacted hydrogen in the low-boiling straight-run gas oil fraction hydrodesulfurization step (I) is used for the hydrodesulfurization of the high-boiling straight-run gas oil fraction hydrodesulfurization step (II) after removal of hydrogen sulfide.

3. An apparatus for desulfurizing a straight-run gas oil fraction, having:
   a low-boiling straight-run gas oil fraction hydrodesulfurization means (a) for desulfurizing a low-boiling straight-run gas oil fraction obtained by fractionating a straight-run gas oil fraction into two fractions at a cut point t° C. (with the proviso that the cut point satisfies the expression of $280 \leq t \leq 360$ (° C.)),
   a high-boiling straight-run gas oil fraction hydrodesulfurization means (b) for desulfurizing a high-boiling straight-run gas oil fraction obtained by fractionating a straight-run gas oil fraction into two fractions at a cut point t° C., said high-boiling straight-run gas oil fraction hydrodesulfurization means (b) not receiving gas containing unreacted hydrogen directly from said low-boiling straight-run gas oil fraction hydrodesulfurization of the means (a),
   a means (c) for mixing a treated oil obtained from the low-boiling straight-run gas oil fraction hydrodesulfurization means (a) with a treated oil obtained from the high-boiling straight-run gas oil fraction hydrodesulfurization means (b), to obtain the treated oil having a sulfur content of not more than 50 ppm, and
   a means (d) for introducing at least a part of a gas containing unreacted hydrogen discharged from the high-boiling straight-run gas oil fraction hydrodesulfurization means (b) into the low-boiling straight-run gas oil fraction hydrodesulfurization means (a).

4. The apparatus for desulfurizing a straight-run gas oil fraction as claimed in claim 3, having:
   a means (e) for removing hydrogen sulfide from at least a part of a gas containing unreacted hydrogen discharged from the low-boiling straight-run gas oil fraction hydrodesulfurization means (a), and
   a means (f) for introducing a gas containing hydrogen and substantially not containing hydrogen sulfide, said gas being obtained from the means (e), into the high-boiling straight-run gas oil fraction hydrodesulfurization means (b).

5. An apparatus for desulfurizing a gas oil fraction, comprising:
   a desulfurizing tower having:
   a low-boiling gas oil fraction hydrodesulfurization section for desulfurizing a low-boiling gas oil fraction,
   a high-boiling gas oil fraction hydrodesulfurization section for desulfurizing a high-boiling gas oil fraction, and
   a means for introducing a gas containing hydrogen into the low-boiling gas oil fraction hydrodesulfurization section from the high-boiling gas oil fraction hydrodesulfurization section, and a means for mixing a desulfurized low-boiling gas oil fraction obtained from the desulfurizing tower with a desulfurized high-boiling gas oil fraction obtained from the desulfurizing tower.

6. The process for desulfurizing a straight-run gas oil fraction as claimed in claim 1, wherein the low-boiling straight-run gas oil fraction is desulfurized under the condition of a total pressure of 50 to 70 kg/cm$^2$G and the high-boiling straight-run gas oil fraction is desulfurized under the condition of a total pressure of 60 to 80 kg/cm$^2$G.

* * * * *

UNITED STATES PATENT AND TRADEMARK OFFICE
CERTIFICATE OF CORRECTION

PATENT NO. : 7,276,150 B2  
APPLICATION NO. : 10/275038  
DATED : October 2, 2007  
INVENTOR(S) : Shigeki Nagamatsu et al.

It is certified that error appears in the above-identified patent and that said Letters Patent is hereby corrected as shown below:

Title Page, Item (57) ABSTRACT: line 7, "desulsurized" should read -- desulfurized --

Column 3, lines 8, 9 and 10, "showing steps" should read -- showing the steps --

Column 24, lines 23 and 24, "(with the proviso that the cut point satisfies the expression of $280 \leq t \leq 360$ (°C.)),"  should read
-- wherein the cut point satisfies the expression of $280 \leq t \leq 360$ (°C.), --

Signed and Sealed this

Fifteenth Day of April, 2008

JON W. DUDAS
*Director of the United States Patent and Trademark Office*